2 Sheets—Sheet 1.

R. BROWN.

WHEEL.

No. 10,851. Reissued July 19, 1887.

Attest
J. Hatton Sims
M. E. Millikan

Inventor
Robert Brown
by Wood & Bond
his Attorneys &c

N. PETERS, Photo-Lithographer, Washington, D. C.

2 Sheets—Sheet 2.

R. BROWN.

WHEEL.

No. 10,851. Reissued July 19, 1887.

Attest
J. Hatton Sims
M. E. Millikan

Inventor
Robert Brown
by Arnold Bond
his Attorneys &c

N. PETERS, Photo-Lithographer, Washington, D. C.

UNITED STATES PATENT OFFICE.

ROBERT BROWN, OF MIAMISBURG, OHIO.

WHEEL.

SPECIFICATION forming part of Reissued Letters Patent No. 10,851, dated July 19, 1887.

Original No. 287,801, dated November 6, 1883. Application for reissue filed September 26, 1885. Serial No. 178,306.

*To all whom it may concern:*

Be it known that I, ROBERT BROWN, a citizen of the United States, residing at Miamisburg, in the county of Montgomery and State of Ohio, have invented a new and useful Improvement in Wheels, of which the following is a specification.

Figure 3:
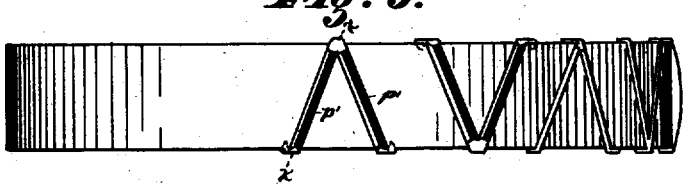
Figure 2:
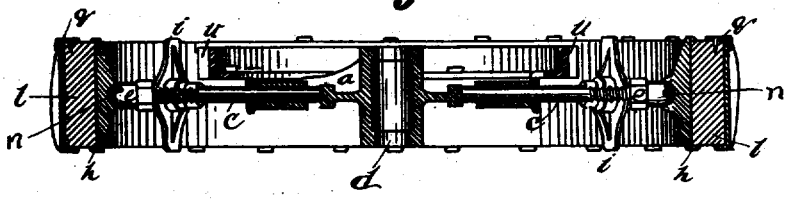
Figure 1:
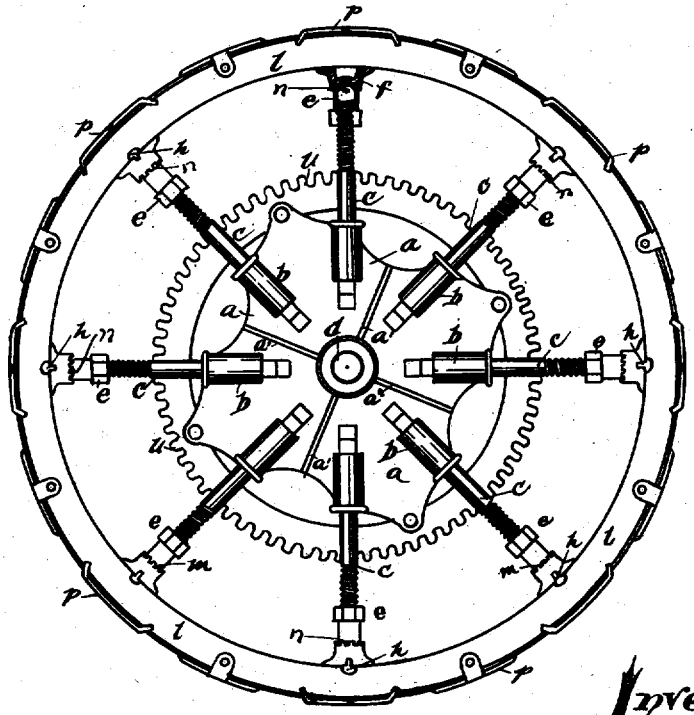
Figure 4:
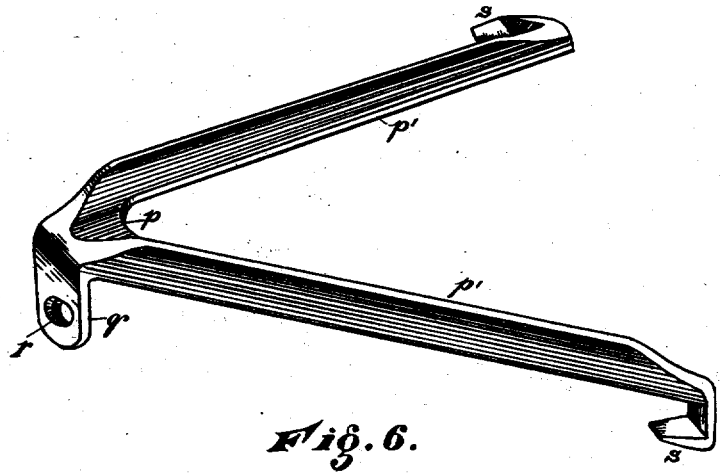
Figure 6:
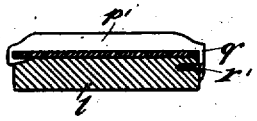
Figure 5:
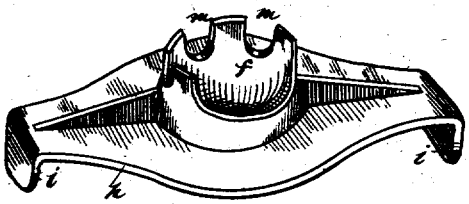
Figure 7:
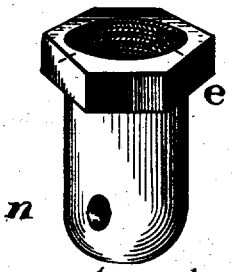

In the accompanying drawings, Figure 1 is an elevation of a wheel embodying my improvements. In this figure I have represented one of the tightening-nuts with its cupped lug in section for purposes of perspicuity. Fig. 2 is a transverse section of the same. Fig. 3 is a transverse elevation representing a number of the traction-pieces removed, as they may be when it becomes desirable to use a belt upon the wheels, to illustrate the working of the machine to which they are attached at fairs or for other show purposes. Fig. 4 is a perspective view of a detached traction-piece. Fig. 5 is a perspective view of the cupped lug against which the nut of the threaded spoke bears. Fig. 6 is a partial sectional elevation through line *x x* of Fig. 3, illustrative of the manner of securing the traction-pieces to the felly and tire; and Fig. 7 is a perspective view of one of the terminal spoke-heads detached.

On each of the figures of the drawings letters of like character indicate corresponding parts.

This invention has for its object cheapness of construction and ready means for adjustment of parts, whereby the wheel can be kept in a rigid state and made to hold together the several parts that compose the wheel, without the necessity for punching and drilling, except where the ends of the tire are riveted together, and even this may be dispensed with should the ends be welded instead of riveted.

The wheel is constructed with a metallic center, *a*, provided with pockets *b* for the reception of spokes *c*, and a hub, *d*, for the reception of an axle. The spokes *c* are plain at one end and abut against the bottom of the pockets *b* at the other end. These spokes are threaded and provided with nuts *e*, that fit into cups *f*, formed in the lugs *h*. The lugs *h* are provided with projecting ears *i*, that fit over both sides of the felly *l* and serve to keep said lugs from lateral movement. The lugs *h* are also provided with apertures *m*, into which pins may be inserted to pass through the perforation *n* in the nut *e*, for the purpose of locking said nut to its place, and thereby prevent unscrewing.

The traction pieces *p* are triangular in shape. At the apex of said triangle a lug, *q*, is formed, said lug being provided with a perforation, *r*. Hooks *s* are formed on each of the sides *p'*. In putting the traction-pieces in place upon the wheel the hooks *s* are driven between the inner surface of the tire and outer surface of the felly until they come home. Then the lug *q* is brought down in the manner illustrated by Fig. 6, and a screw, *r'*, put into the felly holds the traction-piece to place.

The central disk, *a*, is shown as provided with strengthening ribs or arms *a'*, extending along the face of the disk and joining the hub *d*, as shown in the drawings. The object of this disk is twofold—first, to provide a proper base for supporting the driving-wheel *u*, which is secured to said disk, and, second, to shorten the spokes, so as to obtain a strong and rigid traction driving-wheel. For sulky-plows, hay-rakes, and cultivators this driving-wheel *u* might be dispensed with. With this construction and arrangement it is obvious that punching of tire for traction-pieces and boring of felly to receive the ends of same are entirely dispensed with, and yet the wheel will be perfectly rigid and not likely to get out of order. Besides, the spokes can be adjusted to suit the varying conditions of the felly due to exposure to the weather.

I claim—

1. A traction-wheel composed of the hub *a d*, extending radially outward from its center, and provided with radial sockets *b* and spokes *c*, seated therein, and having a screw-threaded connection with a nut which shoulders on a metallic base rigidly connected to the rim, substantially as herein specified.

2. A traction-wheel composed of the metallic hub *a d*, radial sockets *b*, and gear-wheel *u*, in combination with the spokes seated in said sockets, and having a threaded nut-connection with the felly or rim, which is provided with traction-pieces secured to the outer periphery of the rim, substantially as herein specified.

3. A traction-wheel composed, substantially, of the hub *a d*, radial series of sockets *b*, and a series of spokes seated in said sockets having connection with the threaded nut *e*, connected to the rim, for adjusting the tension of the felly, in combination with the driving-wheel *u*, rigidly secured to the hub, substantially as specified.

4. The traction or vehicle wheel herein described, essentially consisting of the web *a*, constructed with hub *d* and radial pockets or fixed tubes *b*, the spokes *c*, fitted in said pockets and provided with screw-threaded outer ends and nuts *e*, and the rim *l*, having lugs *h*, provided with ears *i*, and cups *f*, for receiving the nuts *e*, and suitable means for locking the nuts to said cups, substantially as described.

5. In a traction or vehicle wheel, the combination of the lugs *h*, having ears *i*, and cups *f*, provided with apertures or notches *m*, with the rim, the spokes provided with nuts seated in said cups, and suitable locking-pins, and the hub having pockets for the reception of the inner ends of the spokes, substantially as described.

6. In a traction-wheel, the traction-pieces *p′ p′*, having hooks *s s*, and lugs *q r*, substantially as described.

ROBERT BROWN.

Witnesses:
E. E. WOOD,
M. E. MILLIKAN.